United States Patent [19]
Jodoin

[11] Patent Number: 5,803,140
[45] Date of Patent: Sep. 8, 1998

[54] OIL DRAIN FUNNEL WITH MAGNETIC RETENTION MEANS FOR REMOVABLE ATTACHMENT TO ENGINE OIL PAN

[76] Inventor: David Edward Jodoin, 23633 Fairweather Dr., Canyon Lake, Calif. 92587

[21] Appl. No.: 554,036

[22] Filed: Nov. 6, 1995

[51] Int. Cl.⁶ ................................................. B67C 11/00
[52] U.S. Cl. ........................... 141/332; 141/98; 141/333; 141/383; 141/DIG. 1; 184/1.5
[58] Field of Search ..................... 141/98, 331, 340–342, 141/383, 332, 333, DIG. 1; 184/105, 1.5; 296/38; 180/69.1

[56] References Cited

U.S. PATENT DOCUMENTS

| | | | |
|---|---|---|---|
| Re. 17,613 | 3/1930 | McGowan | 141/331 X |
| 2,899,019 | 8/1959 | Golgan | 184/106 |
| 3,140,756 | 7/1964 | Dinkelkamp | 184/1.5 |
| 3,354,989 | 11/1967 | Anderson | 184/106 |
| 3,750,722 | 8/1973 | Nowak | 141/332 |
| 3,973,549 | 8/1976 | Drummond | 123/198 |
| 4,592,448 | 6/1986 | Morris | 184/1.5 |
| 4,695,088 | 9/1987 | Jensen | 296/38 |
| 5,121,776 | 6/1992 | Kovach | 141/98 |
| 5,143,178 | 9/1992 | Latham, Jr. | 184/106 |
| 5,320,145 | 6/1994 | Avino | 141/98 |
| 5,375,862 | 12/1994 | Sirianno | 280/795 |
| 5,381,839 | 1/1995 | Dowd | 141/242 |

*Primary Examiner*—J. Casimer Jacyna
*Attorney, Agent, or Firm*—Ben E. Lofstedt

[57] ABSTRACT

An oil drain funnel for removable attachment to the bottom of an engine oil pan for receiving oil draining therefrom having a magnetic retention device on the rim of the opening for receiving fluids thereinto, and a crossmember supported by the sidewall of the funnel and spanning the entrance to the opening of the outlet of the funnel to prevent the passage of the oil pan drain plug therethrough while allowing the flow of oil through the outlet.

2 Claims, 2 Drawing Sheets

OIL DRAIN FUNNEL WITH MAGNETIC RETENTION MEANS FOR REMOVABLE ATTACHMENT TO ENGINE OIL PAN

BACKGROUND OF THE INVENTION

1. Field of the Invetion

The present invention relates to apparatus for draining containers and the like. More particularly, this invention relates to a funnel with magnetic retention means for attaching it to the bottom of the outside of the internal combustion engine's oil pan and adapted to be positioned to receive the oil as it drains from the oil pan from the oil drain plug receptacle, and, more specifically, to such an oil drain funnel which incorporates means for holding the oil drain plug therein.

2. Description of the Prior Art

Part of the general maintenance and repair of internal combustion engines such as typically used on cars, motor vehicles, trucks, and the like, is the need to remove various viscous fluids such as spent or used engine oil or transmission fluid, before the maintenance and repair of the engine components related with these fluids can be performed. As, and for an example, it is frequently necessary to remove all oil from engine components in order to rebuild the engine.

In order to drain the oil from the bottom of an oil pan of an internal combustion engine, the oil drain plug must be removed from the oil pan. Typically, the oil drain plug consists of an elongated threaded body topped with a hexagonally-shaped head. The head of the plug is hexagonally-shaped to allow it to be gripped by a standard socket wrench to both remove and install the oil drain plug. Once the plug is removed, the oil in the oil drain pan immediately begins to drain therefrom. When this occurs, the oil flows freely therefrom and into the container placed under the engine to receive the oil.

One of the problems encountered in the draining of oil from an oil pan of an internal combustion engine is that the oil does not flow vertically from the oil pan into a container for receiving waste oil. Frequently, the oil drain plug receptacle is positioned on or near a radius which transitions from the relatively horizontal portion of the bottom of the oil pan to the near vertical portion of the sidewalls of the oil pan.

As a result, there has arisen a need in the art for a device which can be conveniently positioned about the oil drain plug and outlet to both hold the drain plug so that it is readily available for re-installation following the draining of the oil from the engine oil pan, to hold the device in a relatively fixed position during the process of draining the oil, and to direct the drained oil from the device into a container for capturing the drained oil for re-cycling, and all the while, not permitting any spillage of the drained oil.

The only devices found in the prior art were found to be designed to capture and hold the oil rather than to direct the drained oil into an oil container.

One such device is set forth in U.S. Pat. No. 2,899,019 (Colgan) which relates to an oil catcher and discharger for a vehicle. The oil catcher and discharger C is secured to the oil pan A by a plurality of permanent magnets 14 which are mounted in grooves 15 in the frame D of the oil catcher and discharger C. The oil catcher and discharger C is designed to catch oil drips from the oil pan A and to retain the oil in the receptacle E until the automobile has reached a predetermined speed at which time the accumulated oil is discharged onto the roadway.

Another such device is described in U.S. Pat. No. 3,354,989 (Anderson) in which an oil collector and projecting magnetic retention means are combined to retain drips of oil from equipment. Use of this device is mention by the inventor as being useful for application to automobiles (Col. 1, Line 34). Basically, it is described as an open mesh basket 1 having magnet means 7, 8 is filled with an oil-absorbent filing 6.

A yet still another such device is set forth in U.S. Pat. No. 3,973,549 (Drummond) which relates to container B with a pouring spout which is removably supported from the crankcase 8 by a number of elongate permanent magnets E that are vertically adjustable relative to the container B. Use of this container B is shown in FIG. 5 relative to the bottom of an crank case C. The obvious problem with this is that it must have several very strong magnets to support both the weight of the empty container and the drained oil from the oil pan. After the container is filled with the oil drained from the crankcase, the container can be removed and the oil poured therefrom.

Another such device is set forth in U.S. Pat. No. 4,695,088 (Jensen) in which a relatively small oil drip collector is formed of a one-piece plastic unit with a plurality of flexible arms, such as 22 and 23, terminating with magnetic elements, such as 31, 32 therein. A central receptacle 11 is provided for collecting oil drips. The magnets are removably secured to the bottom of an engine crankcase, for example, to collect oil drips.

Another such device is found in U.S. Pat. No. 5,143,178 (Latham) in which a fluid collection and drainage pan for fluids such as oil is used for the collection of oil drained from the bottom of an oil pan and thereafterwards carried to and placed on top of larger container, such as an oil drum 24, and thereafterwards, allowed to drain therefrom into the top opening 20 of the oil drum 24.

A yet still further device is disclosed in U.S. Pat. No. 5,320,145 (Avino) in which a bucket 16 with an opening 22 and a glove 18 secured to the bottom opening 22. FIGS. 1 and 2 define the invention and the use thereof to collect oil being drained from an engine crankcase.

Another device of this type and character is found in U.S. Pat. No. 5,375,862 (Sirianno). Sirianno's invention relates to a large funnel 36 which is secured to a mobile base with a bucket 44 placed therebeneath for collecting the oil drained from the large funnel 36 into the bucket 44.

Yet another device is found and described in U.S. Pat. No. 5,381,839 (Dowd) appears to be a modification of the device described in U.S. Pat. No. 5,375,862 in which the use of a large funnel is used for filling a plurality of liquid containers. FIG. 5 shows the use of this device relative to draining the oil from the engine crankcase 68 of a car 70.

None of these prior art patents show or teach the invention of the applicant herein.

SUMMARY OF THE INVENTION AND OBJECTS

Fundamentally, the instant invention described herein comprises a large funnel having a drain outlet offset with respect to the funnel inlet and a crossbar across the entrance to the drain outlet in the bottom of the funnel and a large single magnet on the lip of the offset portion of the funnel inlet. When the oil plug is removed from the bottom of the oil pan, the oil starts to drain out of the oil pan and into the funnel, and the oil drain plug is dropped into the funnel and captured by the crossmember to prevent it from passing therefrom. The magnet on the funnel is magnetically attached to the oil pan where it remains until removed. The crossmember in front of the funnel outlet prevents the oil drain plug from passing therethrough while allowing the oil in the funnel to enter the entrance of the funnel outlet in the bottom of the funnel and to flow thereinto and out the funnel outlet.

It is one object, feature and advantage of the present invention to provide a funnel for magnetic attachment to the bottom of an engine oil pan about the oil drain outlet.

Another object of the instant invention is to provide a funnel for receiving oil draining from the bottom of an engine oil pan which incorporates magnetic means for removable holding the funnel in a fixed position without the need to manually hold it in place while the oil drains from the engine oil pan into the funnel and into a container for holding the oil drained therefrom.

A yet still further object of the present invention disclosed herein is to provide a funnel useful for receiving oil draining from the bottom of an engine oil pan which incorporates a means for holding the oil drain plug removed from the bottom of an engine oil pan to allow the oil to drain therefrom in the funnel while the oil is being drained thereinto from the engine oil pan without substantially restricting the passage of oil through the funnel.

Another important and primary object, and feature of the instant invention is to incorporate a single magnet formed in the shape of a ring with a exterior magnetic field concentrator as the magnetic retention means for the instant invention herein.

A yet still further and important object of the instant invention is to provide for greater flexibility in positioning the opening defined by the rim of the entrance into the funnel between the place on the bottom of the oil pan where the magnetic retention means is being held and the stream of the oil draining from the bottom of the oil pan thereinto.

These, together with the various ancillary objects and features of the invention which will become apparent as the following description proceeds, are attained by the invention described in detail herein, preferred embodiments thereof being shown in the accompanying drawings, by way of example only, and wherein:

BRIEF DESCRIPTION OF THE DRAWINGS

Further objects and advantages of the present invention will become apparent to those skilled in the art from the following detailed description taken in conjunction with the drawings, in which.

DESCRIPTION OF THE PREFERRED EMBODIMENT OF THE INVENTION

Figure 1:
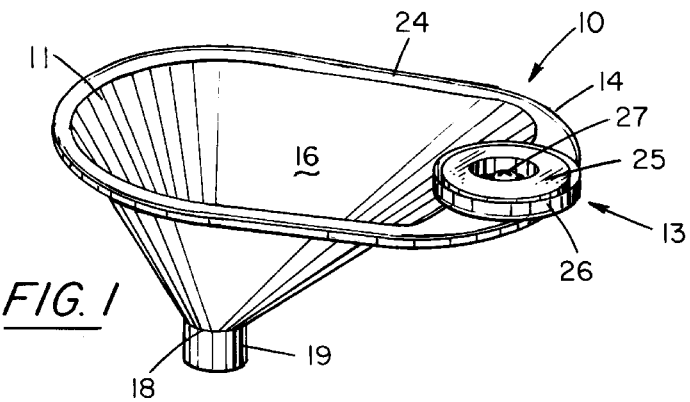
FIG. 1 is a perspective view of the present invention.
Figure 2:
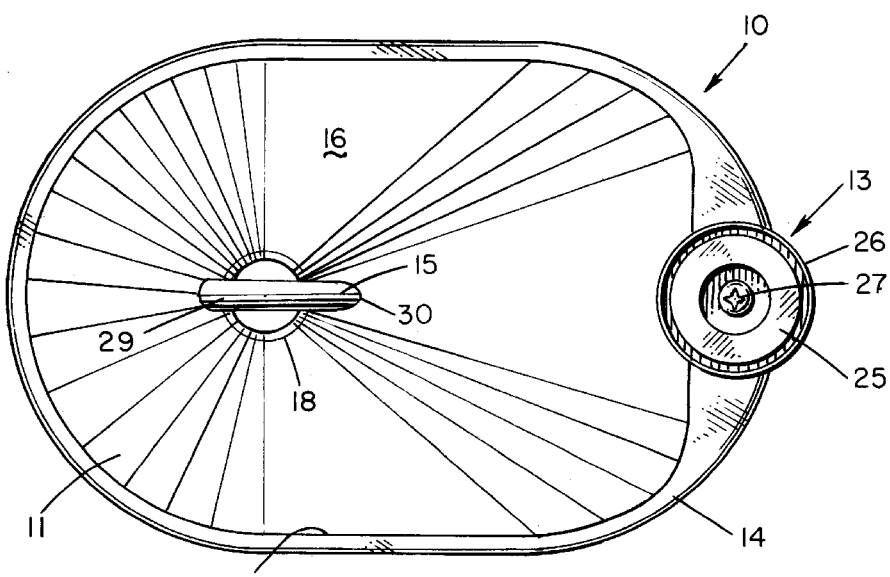
FIG. 2 is a top view of the present invention as depicted and shown in FIG. 1.
Figure 3:
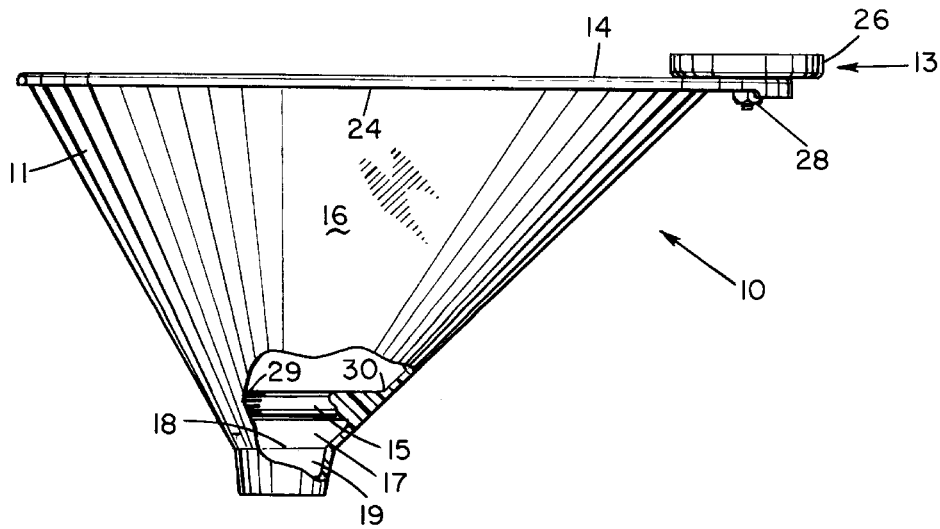
FIG. 3 is a side elevational view shown partially in section of the present embodiment of the instant invention shown and illustrated in FIGS. 1 and 2.

With continued reference to all of the drawings herein, and with special reference now to FIG. 1, the present invention is shown and generally indicated at 10. The present invention 10 comprises a funnel 11 for removable attachment to the bottom of an engine oil pan 12 for receiving oil draining therefrom having a magnetic retention means, generally shown at 13, on the rim 14 of the opening forming the inlet 24 into the funnel 11 for receiving fluids thereinto, and a crossmember means 15 supported by opposite sides of the sidewall 16 of the funnel 11 and spanning the entrance 17 to the opening 18 of the outlet 19 of the funnel 11 to prevent the passage of the oil pan drain plug 20 therethrough while allowing the flow of oil 21 through the outlet 19.

Figure 4:
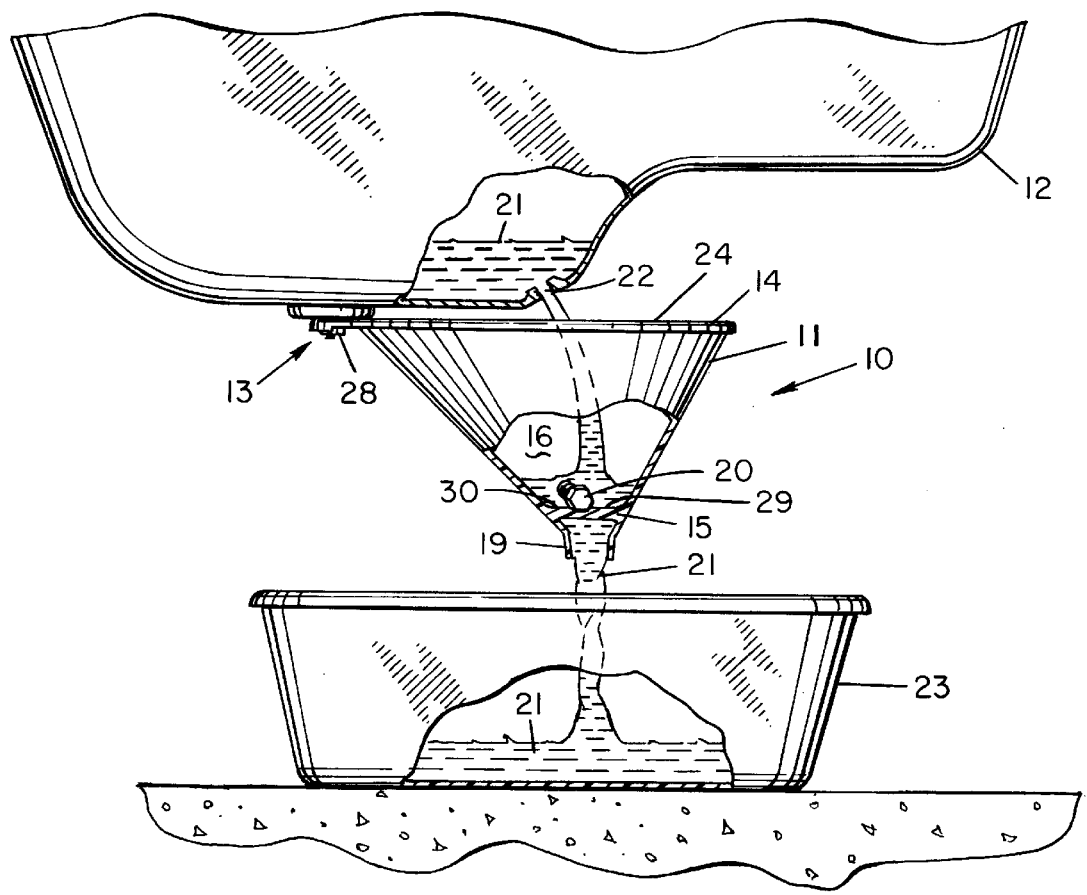
FIG. 4 depicts the present invention disclosed and described in detail herein magnetically attached to the bottom of an engine oil pan wherein the oil is being drained therefrom with the oil pan drain plug restrained in the bottom of the funnel by the crossmember bridging the entrance to the outlet at the bottom of the funnel an the oil draining from the funnel into a container for holding the drained oil.

While it is not necessary to have an large elongated opening into the funnel 11 as defined by the rim 14 as depicted in the drawings which characteristically offsets the outlet 19 from the center of the elongated opening into the funnel 11, such a configuration offers a number of important and significant advantages. First, it presents a larger opening into the funnel 11 which allows rim 14 to be further extended beyond the oil pan to be positioned to receive the oil draining from the bottom of the oil pan 12 out of the oil pan drain plug receptacle 22. Some oil drain plug receptacles are situated as shown in FIG. 4 of the Drawings which directs the flow of oil 21 at an angle displaced from the vertical. Not only does the elongated opening defined by the rim 14 of the figures in the Drawings provide a larger target zone for the oil 21 draining from the bottom of the engine oil pan 12 from the receptacle 22, but it also provides for greater flexibility in positioning the opening defined by the rim 14 between the place on the bottom of the oil pan 12 where the magnetic retention means 13 is being held and the stream of the oil 21 draining thereinto.

The magnetic retention means, generally shown at 13, which is mounted on the rim 14 of the inlet 24 to the funnel 11, is typically formed using a ring-shaped magnet 25 which, in turn, is mounted to a magnetically-attractive, typically, ferrous metal housing 26 for holding the magnet 25 and also serving as a magnetic field concentrator for the magnet 25 as well. Typically, the ring-shaped magnet 25 is glued, or otherwise secured, to the housing 26 which is circular to match the ring-shaped magnet 25. The housing 26 is, in turn, secured to the funnel 11, typically at the rim 14 by any convenient means, such as gluing, or, as shown and described in the Drawings, by means of a bolt 27 and a nut 28 which is passed through a pair of corresponding holes (not shown) in both the housing 26 and the rim 14 of the inlet 24 to the funnel 11.

Additionally, the offsetting of the outlet 19 of the funnel 11 with respect to the elongated inlet 24 to the funnel 11 defined by the rim 14 provides additional volumetric space within the body of the funnel 11 to hold an additional volume of oil 21 during the oil draining process.

The crossmember 15 is positioned immediately in front of the entrance 17 of the opening 18 to the outlet 19 of the funnel 11 and is secured at its opposite ends 29, 30 to the sidewall 16 of the funnel 11. The open spaces on either side of the crossmember 15 and the sidewall 16 of the funnel 11 are such that the oil drain plug 20 which was removed from the bottom of the engine oil pan 12 and the oil pan drain plug receptacle 22 is larger than either of the two open spaces on either side of the crossmember 15 and the sidewall 16 of the funnel 11 and cannot pass therebeyond. As a result, the oil pan drain plug 20 when removed from the oil drain plug receptacle 22 to allow the oil 21 to drain from the oil pan 12 and dropped into the funnel 11, the oil drain plug 20 is held between the crossmember 15 and the sidewall 16 of the funnel 11 in one of the two spaces therebetween, and the oil 21 being drained from the engine oil pan 12 is allowed to pass therethrough and on into the outlet 19 of the funnel 11 and into the pan-like container 23 for capturing the oil 21 drained from engine oil pan 12.

As shown in FIG. 4 of the Drawings, after the oil 21 exits the funnel outlet 19, it is directed into a pan-like container 23 and recycled as required by law.

The foregoing detailed description is illustrative of several embodiments of the invention described and disclosed herein, and it is to be clearly understood that additional embodiments thereof will be obvious to those skilled in the art. The embodiments described herein, together with the additional embodiments, are all considered to be within the scope of the present invention.

What I claim as my invention is:

1. An oil drain funnel for removable attachment to the bottom outside portion of an engine oil pan for receiving oil draining therefrom, comprising:

(a) a funnel having an inlet, an outlet, wherein the diameter of the outlet is smaller than the diameter of the inlet and a sidewall connecting the rim of the inlet with the rim of the outlet;

(b) magnetic retention means secured to the rim of the inlet to the funnel wherein the magnetic retention means includes:

a disc-shaped magnet;

a pan-like housing formed of a magnetically-attractive material for housing the disc-shaped magnet which the disc-shaped magnet is operably secured to, the rim about the housing being co-planar with one side of the disc-shaped magnet; and means for securing the magnet and housing to a portion of the rim of the inlet to the funnel; and (c) means secured to the funnel and spanning the outlet to block the passage of the oil pan drain plug therethrough while allowing the flow of oil through the funnel outlet.

2. The oil drain funnel of claim 1 wherein the inlet to the funnel is elongated, and the center of the funnel outlet is offset with respect to the center of the inlet to the funnel, and the magnetic retention means is secured to a portion of the rim of the elongated funnel inlet furthermost from the center of the funnel outlet.

* * * * *